US012802413B2

(12) United States Patent
Lee et al.

(10) Patent No.: US 12,802,413 B2
(45) Date of Patent: Nov. 17, 2026

(54) METHOD AND APPARATUS FOR EXTRACTING RESULT INFORMATION USING MACHINE LEARNING

(71) Applicant: ELECTRONICS AND TELECOMMUNICATIONS RESEARCH INSTITUTE, Daejeon (KR)

(72) Inventors: Byung-gyu Lee, Daejeon (KR); Sung Uk Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 223 days.

(21) Appl. No.: 18/616,389

(22) Filed: Mar. 26, 2024

(65) Prior Publication Data

US 2024/0331360 A1 Oct. 3, 2024

(30) Foreign Application Priority Data

Mar. 28, 2023 (KR) ........................ 10-2023-0040549

(51) Int. Cl.
*G06V 10/774* (2022.01)
*G06V 10/77* (2022.01)
(Continued)

(52) U.S. Cl.
CPC ........ *G06V 10/774* (2022.01); *G06V 10/7715* (2022.01); *G06V 10/82* (2022.01); *G06V 40/10* (2022.01)

(58) Field of Classification Search
CPC .. G06V 10/774; G06V 10/7715; G06V 10/82; G06V 40/10; G06V 10/764;
(Continued)

(56) References Cited

U.S. PATENT DOCUMENTS 10,643,085 B1 * 5/2020 Kim ...................... G06F 18/217
11,335,023 B2 * 5/2022 Khamis .................... G06N 3/04
(Continued)

FOREIGN PATENT DOCUMENTS

KR 10-2416709 B1 7/2022
KR 10-2022-0124273 A 9/2022

OTHER PUBLICATIONS

Jun, Jinyoung et al. "Human Pose Estimation Using Skeletal Heatmaps", Dec. 31, 2020, APSIPA 2020 [online], pp. 1287-1292. Obtained from IEEE Xplore: <URL: https://ieeexplore.ieee.org/abstract/document/9306241 (Year: 2020).*
(Continued)

*Primary Examiner* — Matthew C Bella
*Assistant Examiner* — Nicholas John Helco
(74) *Attorney, Agent, or Firm* — Rabin & Berdo, P.C.

(57) ABSTRACT

A method of operating a neural network device for extracting result information using machine learning according to an embodiment of the present disclosure includes: extracting feature data from an image frame; storing a pre-trained first training model generated by performing machine learning on the feature data and including first training data; storing a pre-trained second training model that is generated by performing machine learning on the first training data and includes second training data generated according to the four arithmetic operations based on the first training data; and generating two-dimensional vector information on the result information by performing a probability-based operation on the second training data in the image frame based on the second training model.

6 Claims, 5 Drawing Sheets

(51) Int. Cl.
*G06V 10/82* (2022.01)
*G06V 40/10* (2022.01)

(58) Field of Classification Search
CPC ...... G06V 40/103; G06V 10/22; G06V 10/34; G06V 10/77; G06V 10/806; G06N 3/045; G06N 3/098; G06N 3/047; G06N 3/096; G06T 7/251; G06T 2207/20081; G06T 2207/20084; G06T 2207/30196; G06T 5/20; G06T 5/70; G06T 5/75; G06T 7/143; G06T 7/10; G06T 7/60; G06T 7/66; G06T 7/70; G06T 7/73; G06T 7/75; G06T 2207/20021; G06T 2207/20044; G06T 2207/20076; G06T 2207/20121; G06T 2207/20124; G06T 2207/20212; G06T 2207/20221; G06T 2207/30244
See application file for complete search history.

(56) References Cited

U.S. PATENT DOCUMENTS

2019/0213388 A1 7/2019 Makeev et al.
2020/0272888 A1* 8/2020 Wang ........................ G06N 3/08
2020/0311395 A1 10/2020 Kim et al.
2021/0264144 A1* 8/2021 Cho ........................ G06V 10/82
2022/0055221 A1 2/2022 Ko et al.
2023/0096850 A1* 3/2023 Wang ..................... G16H 50/20 382/103
2023/0139994 A1* 5/2023 Zhou ...................... G06V 40/20 382/156

OTHER PUBLICATIONS

Zhe Cao et al., “OpenPose: Realtime Multi-Person 2D Pose Estimation using Part Affinity Fields”, IEEE Transactions on Pattern Analysis and Machine Intelligence, arXiv:1812.08008v2 [cs.CV], pp. 1-14, May 30, 2019.
Chu et al.,“Structured Feature Learning for Pose Estimation”, arXiv:1603. 09065v1, Mar. 30, 2016.
Mao et al.,“Robust Convolutional Neural Network Cascade for Facial Landmark Localization Exploiting Training Data Augmentation”, IS&T International Symposium on Electronic Imaging 2018, 2018.
Xu et al.,“Deep Gradient Projection Networks for Pan-sharpening”, arXiv: 2103.04584v1, Mar. 8, 2021.

* cited by examiner

METHOD AND APPARATUS FOR EXTRACTING RESULT INFORMATION USING MACHINE LEARNING

CROSS-REFERENCE TO RELATED APPLICATION

This application claims priority to and the benefit of Korean Patent Application No. 2023-0040549, filed on Mar. 28, 2023, the disclosure of which is incorporated herein by reference in its entirety.

BACKGROUND

1. Field of the Invention

The present invention relates to a technique for extracting result information using machine learning, and more particularly, to a technique for performing machine learning based on feature data extracted from image information on an object.

2. Discussion of Related Art

Methods of estimating 2D joint coordinates and skeletons of several people in an RGB image using a deep learning network are largely classified into two types. The first method is a top-down method of extracting an area of interest in which each object is positioned for each human object in an image and estimating joint coordinates and skeletons of each human object in each area of interest. The second method is a bottom-up method of estimating all joint coordinates of various people in an image and each relation between the joints, and estimating skeletons of each person based on the joint information and the relations.

Since the top-down method involves detecting each human object in an image and inferring joint information from the detected area of interest, it has the advantage of being able to infer more accurate joint information compared to the bottom-up method in which joint information is inferred from all areas of the image. However, since an additional object detector is required to detect human objects, and a deep learning network should infer joint information repeatedly as many times as the number of detected objects, when the number of human objects in an image increases, the top-down method has the disadvantage that it takes longer to perform than the bottom-up method in which all joints are inferred from the image at once.

In the existing method, the joint information and the joint relation information are composed of deep learning-based network models, and the processor learns multiple images to find optimal kernel values for generating filter maps and weights for generating heat maps and part affinity fields (PAFs). The processor generates skeletal information of a joint by performing calculations in a central processing unit (CPU) using the heat maps and the PAF values that are the outputs of the deep learning network models.

The above-described conventional method can operate in real time in an inference environment using a graphics processing unit (GPU), but cannot operate in real time in a system such as a mobile device that has relatively poor deep learning inference performance. In particular, a post-processing process of completing the skeletal information on each person using the heat map and PAF inferred from the deep learning network is processed by the CPU, which is a major cause of slow performance.

SUMMARY OF THE INVENTION

The present invention is directed to providing a method and apparatus for acquiring result information more quickly and efficiently by efficiently distributing networking resources used for machine learning.

According to an aspect of the present invention, there is provided a method of operating a neural network device for extracting result information using machine learning, including: extracting feature data from an image frame; storing a pre-trained first training model generated by performing machine learning on the feature data and including first training data; storing a pre-trained second training model that is generated by performing machine learning on the first training data and includes second training data generated according to four arithmetic operations based on the first training data; and generating two-dimensional vector information on the result information by performing a probability-based operation on the second training data in the image frame based on the second training model.

The image frame may include an image area that corresponds to a human body and is divided into a plurality of areas, and the first training data may be generated based on feature information corresponding to the plurality of areas, and include relation information between the plurality of areas and joint information of the body generated by the machine learning based on the feature information.

The joint information may include heat map information that corresponds to one area randomly selected from among the plurality of areas and indicates a probability that the one area is the area corresponding to the joint of the body.

The second training data may be data obtained by summing: the heat map information; first modified heat map information obtained by subtracting noise information from the heat map information; second modified heat map information compressed by performing max pooling of a preset scale on the first modified heat map information; and the relation information.

The second training model may apply the second training data as an additional layer to the first training model.

The body included in the image frame may be composed of a plurality of entities, and the joint information and the relation information may correspond to the plurality of entities.

The result information may be information on each body corresponding to the plurality of entities, and include skeletal information corresponding to the each body.

According to another aspect of the present invention, there is provided an apparatus for operating a neural network device for extracting result information using machine learning, including: a memory that includes at least one program; and a processor that performs a calculation by executing the at least one program, in which the processor is configured to extract feature data from an image frame; store a pre-trained first training model generated by performing machine learning on the feature data and including first training data; store a pre-trained second training model that is generated by performing machine learning on the first training data and includes second training data generated according to four arithmetic operations based on the first training data; and generate two-dimensional vector information on the result information by performing a probability-based operation on the second training data in the image frame based on the second training model.

The image frame may include an image area that corresponds to a human body and is divided into a plurality of areas, and the first training data may be generated based on feature information corresponding to the plurality of areas, and include relation information between the plurality of areas and joint information of the body generated by the machine learning based on the feature information.

The joint information may include heat map information that corresponds to one area randomly selected from among the plurality of areas and indicates a probability that the one area is the area corresponding to the joint of the body.

The second training data may be data obtained by summing: the heat map information; first modified heat map information obtained by subtracting noise information from the heat map information; second modified heat map information compressed by performing max pooling of a preset scale on the first modified heat map information; and the relation information.

The second training model may apply the second training data as an additional layer to the first training model.

The body included in the image frame may be composed of a plurality of entities, and the joint information and the relation information may correspond to the plurality of entities.

The result information may be information on each body corresponding to the plurality of entities, and includes skeletal information corresponding to the each body.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
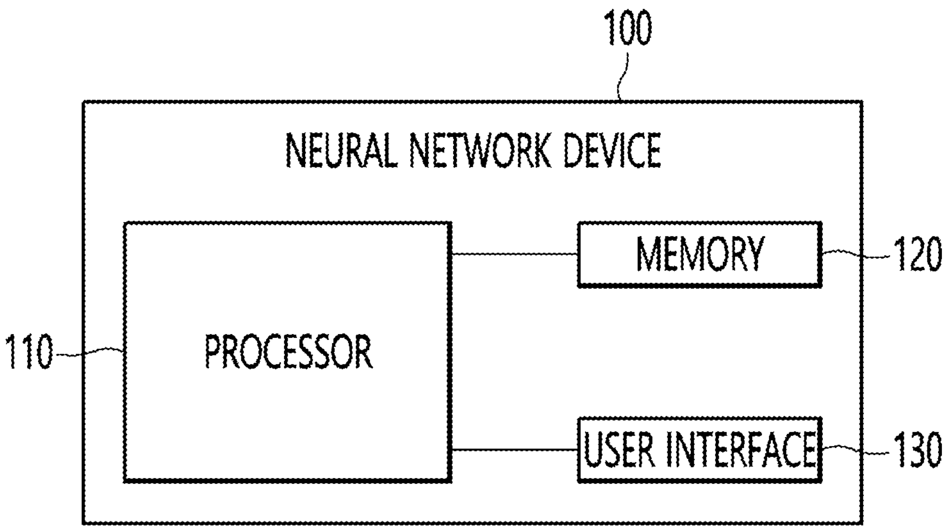
FIG. 1 is a block diagram illustrating a hardware configuration of a neural network device (100) according to an embodiment of the present disclosure.

Phrases such as "in some embodiments" or "in one embodiment" appearing in various places in this specification are not necessarily all referring to the same embodiments.

Some embodiments of the present disclosure may be represented by functional block configurations and various processing steps. Some or all of these functional blocks may be implemented by various numbers of hardware and/or software components that perform specific functions. For example, the functional blocks of the present disclosure may be implemented by one or more microprocessors, or may be implemented by circuit configurations for a predetermined function. In addition, for example, the functional blocks of the present disclosure may be implemented in various programming or scripting languages. Functional blocks may be implemented as algorithms executed by one or more processors. In addition, the present disclosure may employ a conventional technology for electronic environment setting, signal processing, data processing, and/or the like. Terms such as "mechanism," "element," "means," and "configuration" may be used broadly, and are not limited to mechanical and physical configurations.

In addition, connecting lines or connecting members between the components illustrated in the drawings are merely illustrative of functional connections and/or physical or circuit connections. In an actual apparatus, connections between components may be represented by various functional connections, physical connections, or circuit connections that can be replaced or added.

FIG. 1 is a block diagram illustrating a hardware configuration of a neural network device 100 according to an embodiment of the present disclosure.

The neural network device 100 may be implemented in various types of devices such as a personal computer (PC), a server device, a mobile device, and an embedded device. Specific examples of the neural network device 100 may include smartphones, tablet devices, augmented reality (AR) devices, Internet of Things (IoT) devices, autonomous vehicles, robotics, medical devices, and the like, which perform voice recognition, image recognition, and image classification using neural networks, but are not limited thereto. Furthermore, the neural network device 100 may correspond to a dedicated hardware accelerator (HW accelerator) mounted in the above device, and the neural network device 100 may be a hardware accelerator such as a neural processing unit (NPU), a tensor processing unit (TPU), and a neural engine that are dedicated modules for driving a neural network.

Referring to FIG. 1, the neural network device 100 includes a processor 110, a memory 120, and a user interface 130. Only components related to the present embodiments are illustrated in the neural network device 100 illustrated in FIG. 1. Accordingly, it is obvious to those skilled in the art that the neural network device 100 may further include other general-purpose components in addition to the components illustrated in FIG. 1.

The processor 110 serves to control overall functions for executing the neural network device 100. For example, the processor 110 generally controls the neural network device 100 by executing programs stored in the memory 120 of the neural network device 100. The processor 110 may be implemented by a central processing unit (CPU), a graphics processing unit (GPU), an application processor (AP), and the like, which are included in the neural network device 100, but is not limited thereto.

The memory 120 is hardware that stores various types of data processed by the neural network device 100. For example, the memory 120 may store data that has been processed and data that is to be processed by the neural network device 100. In addition, the memory 120 may store applications, drivers, or the like to be driven by the neural network device 100. The memory 120 may include a random access memory (RAM) such as a dynamic random access memory (DRAM) and a static random access memory (SRAM), a read-only memory (ROM), an electrically erasable programmable read-only memory (EEPROM), a CD-ROM, a Blu-ray or other optical disk storage, a hard disk drive (HDD), a solid state drive (SSD), or a flash memory.

The processor 110 may train a motion recognition model through a test data set, estimate positions of objects or a relationship between objects from image information based on the trained model (hereinafter referred to as "training model"), or estimate the overall structure of the objects. Estimating the position, relationship, or structure of the object by the processor may be performed based on skeleton tracking using key points of joints constituting the object and relationship information between the respective joints.

The processor 110 may classify an object's posture or behavior (hereinafter referred to as "behavior") based on the skeleton tracking. In the behavior classification, behaviors within an image frame are performed by a determined "object," and a "target" is defined as any kind of target that presents "key points" that may be detected in an image frame, may perform a behavior, and may be perceived.

For example, a behavior may be a creature behavior (i.e., an object is a creature), or more specifically, a human behavior (i.e., an object is a human). In the example of the human behavior classification, which will be explained in more detail below, the key points are unique human anatomical features, more specifically, joints (such as knees, elbows, shoulders, etc.), extremities (such as hands, feet, a head, etc.), or visible organs (such as eyes, ears, a nose, etc.).

In other words, the key points are points of objects that may be easily tracked and allow behaviors to be differentiated. For example, in the case of a human joint, a wrist may be easily tracked and a wide range of arm postures may be differentiated.

A list of n predetermined key points may be provided. A general key point in this list may be referred to as key point j. For example, n is 18 human joints (specifically, two ankles, two knees, two hip joints, two shoulders, two elbows, two wrists, two ears, two eyes, a nose, and a body center), which may be considered as key points.

The processor 110 may train a motion recognition model using a test data set. The test data set may include an image frame that will be described later and/or feature data extracted from the image frame.

The neural network device 100 may train a test data set for a human body image through machine learning to generate key points for joints constituting the body and result data for the relationship between the joints.

According to the embodiment of the present disclosure, the neural network device 100 may add, as a separate layer, an operation (hereinafter, "post-processing operation") of generating a training model including first training data generated through machine learning and post-processing the joint information to the generated first training model.

Thereafter, the neural network device 100 may generate a second training model including second training data by machine-learning the first training data based on the training model and the separate layer for the post-processing operation.

Thereafter, the neural network device 100 may generate result data for a skeletal structure of a body based on the second training data acquired from the second training model.

Although not illustrated in FIG. 1, the neural network device 100 may further include an image feature extraction unit, a joint information extraction unit, a joint relation extraction unit, a joint information post-processing unit, and a skeleton generation unit. The operation of the processor 110 may be functionally divided and performed by each of the above-described components (hereinafter referred to as "additional functional unit"). Details of the additional function unit will be described with reference to FIGS. 3A and 3B.

According to an embodiment, the processor 110 of the neural network device 100 may be operatively connected to an additional functional unit, which is an independent component, to provide a control command for each component.

Figure 2:
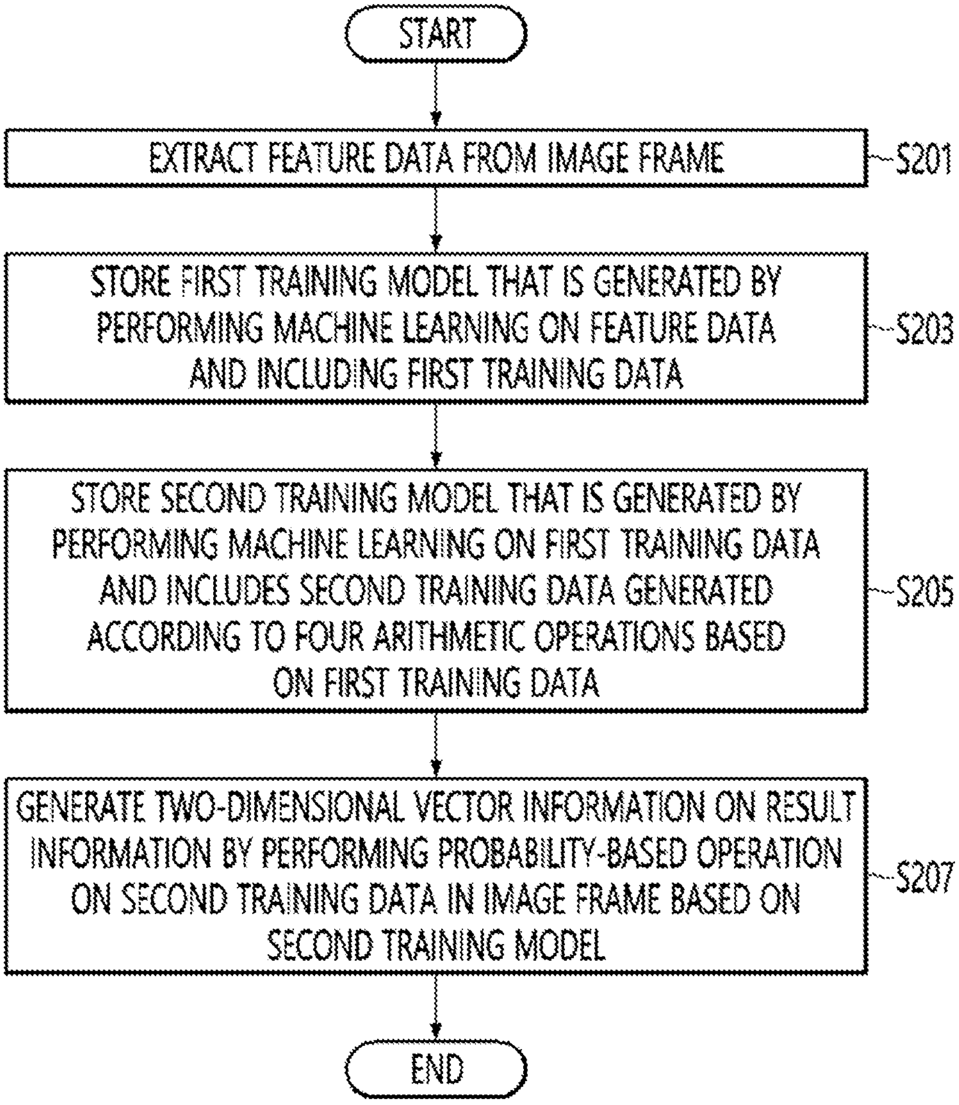
FIG. 2 is a flowchart of an operation of the neural network device (100) according to the embodiment of the present disclosure.

FIG. 2 is a flowchart of an operation of the neural network device 100 according to the embodiment of the present disclosure.

The operation of the neural network device 100 included in the flowchart of FIG. 2 may be understood as the operation of the processor 110 included in the neural network device 100, and each operation has a causal relationship and is not limited to being performed in the listed order unless there is a special circumstance in which it should be performed in the listed order.

In operation S201, the processor 110 extracts feature data from the image frame.

The image frame may be any one of the respective image frames divided from the image data at preset intervals. The image frame may be image data corresponding to a specific point in time among image data or static image data.

The image frame may be visual information acquired from an optical sensor such as a camera, and may be, for example, at least a part of an RGB image.

The image frame may include an area (hereinafter referred to as "object area") corresponding to at least one object and may include feature data corresponding to the object area. The image feature extraction unit of the neural network device 100 may receive an image frame as an input, extract features, and generate a feature map based on the extracted features.

According to another embodiment of the present disclosure, the feature data corresponding to an area (hereinafter referred to as "background area") other than the object area may be included in the image frame.

An operation of the image feature extraction unit extracting the feature data from the image frame may be performed step by step. For example, the image feature extraction unit may perform an operation of sequentially extracting a low-level feature, a mid-level feature, and a high-level feature from an image frame. Thereafter, the image feature extraction unit may generate feature data by training and classifying the extracted step-by-step feature information.

In operation S203, the processor 110 stores the first training model that is generated by the machine learning for the feature data and includes the first training data.

In the machine learning for the feature data, at least one type of training target may be determined according to an attribute. More specifically, the processor 110 may perform a first type of machine learning on feature data to identify a position of at least some object areas. In addition, the processor 110 may perform a second type of machine learning on feature data to identify a relationship of at least some object areas.

For example, when the object included in the image frame is a human body image and the feature data corresponds to each part of the body, the processor 110 may calculate the probability that the feature data is data for a predetermined body part through the first type of machine learning. Similarly, when the feature data corresponds to each part of the body, the processor 110 may calculate information on the relationship between the feature data and other feature data through the second type of machine learning.

The first type of machine learning may be performed by a heat map extraction method, and the second type of machine learning may be performed by a part affinity fields (PAF) extraction method.

The first training data may be data generated through the machine learning on the feature data. Therefore, as described above, when the processor 110 performs machine learning in two ways, the first type and the second type, the first training data may be classified into two types. For example, when an object included in an image frame is a human body image and feature data corresponds to each part of the body, the first training data may include first result data for data corresponding to a specific part of the body among the feature data and second result data for data corresponding to a relationship between feature data in the body image. The processor 110 may extract a plurality of feature data from a plurality of image frames and generate the first training model including the first training data generated through repetitive machine learning.

When feature data extracted from an arbitrary image frame is input, the processor 110 may output result data corresponding to a predetermined machine learning type through the generated first training model.

In step S205, the processor 110 stores the second training model that is generated by the machine learning for the first training data and includes the second training data generated according to the four arithmetic operations based on the first training data.

The second training data may be result data generated by the processor 110 applying a simple operation (e.g., the four arithmetic operations) to the first training data.

The simple operation is an operation performed by the processor 110 on at least a part of the first training data, and may include the four arithmetic operations such as matrix multiplication. The simple operation may be computed on multiple cores in batches via a graphics processing unit (GPU).

The present disclosure generates a new machine training model (e.g., a second training model) by adding operations requiring the simple operation, such as the post-processing operation, to a machine learning network as a separate layer. Since the simple operation does not need to be performed by the CPU, the load on the terminal (e.g., mobile device) in the post-processing operation may be alleviated by batch processing in the GPU in charge of the machine learning.

Specifically, the second training data generated through the simple operation may be a value obtained by summing at least a part of secondary data and primary training data generated by performing conversion, filtering, or compression according to a predetermined criterion on at least a part of the first training data.

In operation S207, the processor 110 generates two-dimensional vector information on result information by performing a probability-based operation on the second training data on the image frame based on the second training model.

The processor 110 may identify result information having the highest probability through the probability-based operation, and convert the result information into vector information.

Specifically, the processor 110 acquires the first training data about position information on objects and relational information between the objects through the first training model from feature data for an image frame. Thereafter, the post-processing operation is performed from the first training data through the secondary training model, and the result information on the overall structure of the object is acquired by performing the probability-based operation on the post-processed secondary training data.

For example, when the image frame is a human body image and the object is an image area of the human body, the position information of the objects is key points for joints of the human body, and the relation information between the objects may be a vector representing the relationship between the joints. In addition, the overall structure of the object may be the skeletal structure of the human body determined based on the positions and relation information of the joints of the human body.

Figure 3A:
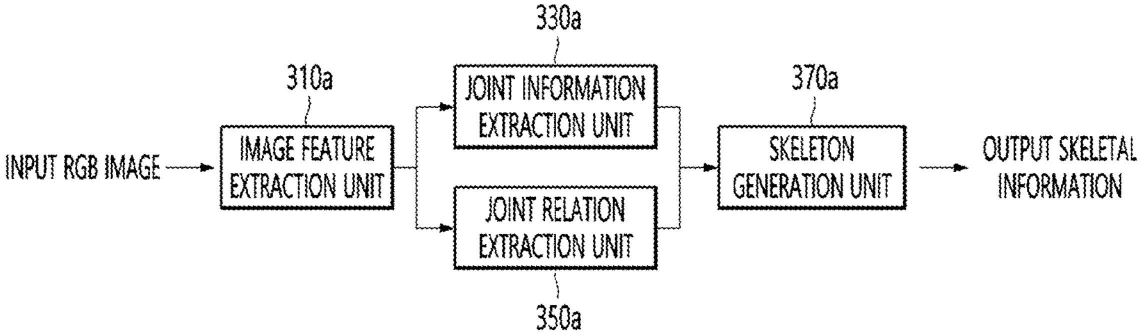
FIG. 3A is a configuration diagram of an operation of generating skeletal information by the neural network device (100) according to the embodiment of the present disclosure.

FIG. 3A is a configuration diagram of an operation of generating skeletal information by the neural network device 100 according to the embodiment of the present disclosure.

The processor 110 of the neural network device 100 according to an embodiment of the present disclosure may include a plurality of functionally divided additional functional units.

More specifically, the processor 110 may include an image feature extraction unit 310*a*, a joint information extraction unit 330*a*, a joint relation extraction unit 350*a*, and a skeleton generation unit 370*a*.

The image feature extraction unit 310*a* may acquire RGB image information and extract feature data from the acquired RGB image information. Here, the RGB image information may be understood as the same as or similar to the above-described image frame.

An operation of extracting feature data by the image feature extraction unit 310*a* may be performed through the machine learning, and may be performed step by step according to the type of feature.

The joint information extraction unit 330*a* may acquire feature data generated by the image feature extraction unit 310*a* to extract joint information. Here, the joint information is information on the joints of the human body existing in the image area corresponding to the human body included in the image frame, and may specifically be the key points for the joints.

In detail, the joint information extraction unit 330*a* may generate a heat map of key points indicating position estimation values of the key points of the image frame. A heat map is associated with a pair (frame t, key point j). For each frame t, an additional heat map for the background may be generated.

In the present disclosure, the heat map may be a probabilistic map indicating an expected probability of each joint being present in each pixel of an image frame. The joint information extraction unit 330*a* may generate the heat map for the key points corresponding to the joints.

An operation of extracting the heat map for the key points by the joint information extraction unit 330*a* may be generated through the machine learning, and the extracted heat map may be at least a part of the first training data.

The joint relation extraction unit 350*a* may acquire the feature data generated by the image feature extraction unit 310*a* to extract the joint relation information. Here, the joint relation information is information indicating a relationship to each of the joints of the human body existing in an image area corresponding to the human body included in the image frame, and may be specifically vector information between the key points for the joints.

In detail, the joint relation extraction unit 350*a* may extract the PAF based on the feature map generated by the image feature extraction unit 310*a*. For example, in the case of the human body, a PAF indicating a relationship between a key point corresponding to a right shoulder and a key point corresponding to an elbow joint may be extracted.

The operations of the joint information extraction unit 330*a* and the joint relation extraction unit 350*a* may be performed within the deep learning network of the neural network device 100 according to an embodiment of the present disclosure.

The skeleton generation unit 370*a* may acquire the heat map for each joint extracted from the joint information extraction unit 330*a* and the PAF extracted from the joint relation extraction unit 350*a*, and generate joint skeletons for each person in the image frame by performing the post-processing operation. Here, the post-processing operation may be an operation of processing the result data generated by the joint information extraction unit 330*a* and the joint relation extraction unit 350*a* into information necessary for generating the joint skeleton through processes such as summing, compression, conversion, and filtering. The skeleton generation unit may perform the four simple arithmetic operations such as matrix multiplication for the post-processing operation.

Referring to FIG. 3A, such a simple operation is performed outside the deep learning network, and the skeleton generation unit may perform the simple operation of the post-processing operation using the CPU.

Figure 3B:
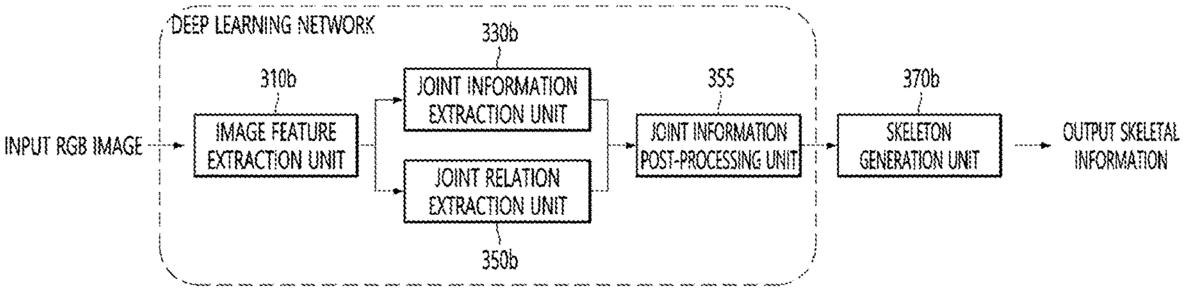
FIG. 3B is another configuration diagram of the operation of generating the skeletal information by the neural network device (100) according to the embodiment of the present disclosure.

FIG. 3B is another configuration diagram of the operation of generating the skeletal information by the neural network device 100 according to the embodiment of the present disclosure.

Referring to FIG. 3B, the neural network device 100 according to the embodiment of the present disclosure may extend the range of the deep learning network used to generate the skeletal structure of the joint.

More specifically, the processor 110 of the neural network device 100 may assign the post-processing operation performed by the skeleton generating unit 370*a* of FIG. 3A to the joint information post-processing unit 355. Here, the joint information post-processing unit 355 may machine-learn result data (hereinafter referred to as "first training data") generated by a joint information extraction unit 330*b* and a joint relation extraction unit 350*b* to generate the second training model including the result data (hereinafter, "second training data") according to the post-processing operation. Therefore, the post-processing operation may be performed through the machine learning within the deep learning network. The joint information post-processing unit 355 performing the post-processing operation may be driven using the GPU of the neural network device 100. Therefore, the neural network device 100 may more quickly and efficiently perform the post-processing operation including the process of the four simple arithmetic operations.

The joint information post-processing unit 355 may generate the second training data according to the result of the post-processing operation, and the skeleton generation unit 370*b* may generate the skeletal information of the joint based on the second training data.

Figure 4:
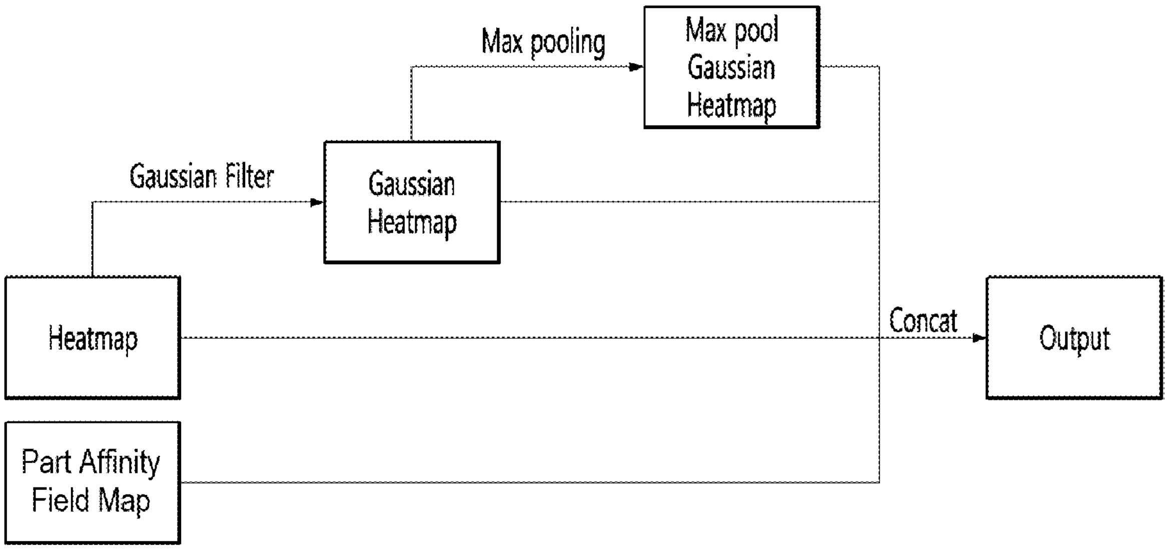
FIG. 4 illustrates a post-processing operation performed by the neural network device (100) according to the embodiment of the present disclosure.

FIG. 4 illustrates a post-processing operation performed by the neural network device 100 according to the embodiment of the present disclosure.

The operation of FIG. 4 may be performed by the joint information post-processing unit 355. The joint information post-processing unit 355 may acquire the joint information (e.g., heat map) and the joint relation information (e.g., PAF map) from the joint information extraction unit 350*b* and the joint relation extraction unit 370*b*, and perform the simple calculation on the acquired information.

More specifically, the joint information post-processing unit 355 may generate a Gaussian heat map by applying a Gaussian filter to the heat map. The operation of generating the Gaussian heat map may be referred to as an operation of removing noise.

Then, the joint information post-processing unit 355 may generate a max pool Gaussian heat map by applying the max pooling to the Gaussian heat map in order to use the maximum value.

The joint information post-processing unit 355 may generate the second training data as result data (output) by concatenating the PAF map, the heat map, the Gaussian heat map, and the max full Gaussian heat map.

Figure 5:
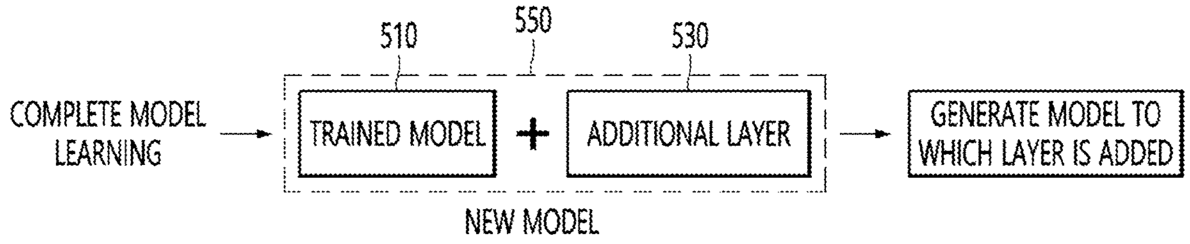
FIG. 5 is a configuration diagram of an operation of generating a second training model by the neural network device (100) according to the embodiment of the present disclosure.

FIG. 5 is a configuration diagram of an operation of generating a second training model by the neural network device 100 according to the embodiment of the present disclosure.

The neural network device 100 may generate the first training model that outputs the joint information and the joint relation information based on the feature data. Referring to FIG. 5, the first training model may be referred to as a trained model 510.

Thereafter, the neural network device 100 may add a series of processes performed by the joint information post-processing unit 355 to the trained model 510 and add these processes as a new layer. In this case, the neural network device 100 may train a new model 550 including an additional layer 530. In this case, the result data (i.e., second training data) for the new model 550 may be generated by applying result data (i.e., first training data) derived from the trained model 510 to an additional layer.

By introducing such an additional layer, the neural network device 100 according to an embodiment of the present disclosure may offload the load applied to the CPU of the processor 110 to the GPU by including an operation performed outside the deep learning network in the deep learning network.

In particular, the post-processing operation performed in the additional layer is a simple operation of concatenating the result value of the Gaussian filtering and the max pooling. It is possible to acquire results more quickly when the post-processing operation is processed in parallel through the machine learning using the GPU than when the post-processing operation is performed by the CPU, which is advantageous in terms of efficiency of resource use.

According to the present disclosure, it is possible to acquire result information more quickly and efficiently by efficiently distributing networking resources used for machine learning.

Those skilled in the art related to this embodiment will be able to understand that the embodiment may be implemented in a modified form without departing from the essential characteristics of the above description. Therefore, embodiments disclosed herein should be considered in an illustrative aspect rather than a restrictive aspect. The scope of the present invention should be defined by the claims rather than the above description, and equivalents to the claims should be interpreted to fall within the present embodiment.

What is claimed is:

1. A method of operating a neural network device for extracting result information using machine learning, the method comprising:

extracting feature data from an image frame;

storing a pre-trained first training model generated by performing machine learning on the feature data and including first training data;

storing a pre-trained second training model that is generated by performing machine learning on the first training data and includes second training data generated according to four arithmetic operations based on the first training data; and generating two-dimensional vector information on result information by performing a probability-based operation on the second training data in the image frame based on the second training model, wherein the image frame includes an image area that corresponds to a human body and is divided into a plurality of areas, and the first training data is generated based on feature information corresponding to the plurality of areas, and includes relation information between the plurality of areas and joint information of the body generated by the machine learning based on the feature information, wherein the joint information includes heat map information that corresponds to one area randomly selected from among the plurality of areas and indicates a probability that the one area is the area corresponding to the joint of the body, wherein the second training data is data obtained by summing:

the heat map information;

first modified heat map information obtained by subtracting noise information from the heat map information;

second modified heat map information compressed by performing max pooling of a preset scale on the first modified heat map information; and the relation information, and wherein the second training model applies the second training data as an additional layer to the first training model in a post-processing operation performed on a graphics processing unit (GPU).

2. The method of claim 1, wherein the body included in the image frame is composed of a plurality of entities, and the joint information and the relation information correspond to the plurality of entities.

3. The method of claim 2, wherein the result information is information on each body corresponding to the plurality of entities, and includes skeletal information corresponding to each body.

4. An apparatus for operating a neural network device for extracting result information using machine learning, the apparatus comprising:

a memory in which at least one program is stored; and a processor that performs a calculation by executing the at least one program, wherein the processor is configured to:

extract feature data from an image frame;

store a pre-trained first training model generated by performing machine learning on the feature data and including first training data;

store a pre-trained second training model that is generated by performing machine learning on the first training data and includes second training data generated according to four arithmetic operations based on the first training data; and generate two-dimensional vector information on the result information by performing a probability-based operation on the second training data in the image frame based on the second training model, wherein the image frame includes an image area that corresponds to a human body and is divided into a plurality of areas, and the first training data is generated based on feature information corresponding to the plurality of areas, and includes relation information between the plurality of areas and joint information of the body generated by the machine learning based on the feature information, wherein the joint information includes heat map information that corresponds to one area randomly selected from among the plurality of areas and indicates a probability that the one area is the area corresponding to the joint of the body, wherein the second training data is data obtained by summing:

the heat map information;

first modified heat map information obtained by subtracting noise information from the heat map information;

second modified heat map information compressed by performing max pooling of a preset scale on the first modified heat map information; and the relation information, and wherein the second training model applies the second training data as an additional layer to the first training model in a post-processing operation performed on a graphics processing unit (GPU).

5. The apparatus of claim 4, wherein the body included in the image frame is composed of a plurality of entities, and the joint information and the relation information correspond to the plurality of entities.

6. The apparatus of claim 5, wherein the result information is information on each body corresponding to the plurality of entities, and includes skeletal information corresponding to each body.

* * * * *